United States Patent [19]
Wieczorek et al.

[11] Patent Number: 5,249,305
[45] Date of Patent: Sep. 28, 1993

[54] RADIO FREQUENCY ERROR DETECTION AND CORRECTION SYSTEM

[75] Inventors: Alfred B. Wieczorek, Plantation, Fla.; Charles N. Lynk, Jr., Bedford; Walter J. Rozanski, Jr., Hurst, both of Tex.; Kenneth J. Zdunek, Schaumburg; Terry K. Mansfield, Palatine, both of Ill.

[73] Assignee: Motorola, Inc., Schaumburg, Ill.

[21] Appl. No.: 705,875

[22] Filed: May 28, 1991

Related U.S. Application Data

[63] Continuation-in-part of Ser. No. 413,144, Sep. 27, 1989, abandoned.

[51] Int. Cl.⁵ .................... H04B 7/26; H04B 17/00
[52] U.S. Cl. .................... 455/54.2; 455/67.1; 455/71; 455/76
[58] Field of Search ............ 455/51.1, 54.1, 54.2, 455/67.1, 68–71, 75, 76, 88, 183, 260; 371/32; 375/97, 107, 109, 111

[56] References Cited

U.S. PATENT DOCUMENTS 4,670,889  6/1987  Hewitt .................. 455/69 X

FOREIGN PATENT DOCUMENTS 0290321  11/1989  Japan .................. 455/71

Primary Examiner—Reinhard J. Eisenzopf
Assistant Examiner—Chi Pham
Attorney, Agent, or Firm—Juliana Agon

[57] ABSTRACT

A radio communication system including a control station and at least one remote station (20) is provided. The control station has a receiver for receiving radio signals, a transmitter for transmitting radio signals and a demodulator for measuring the frequency of the received signals. Responsive to a request for frequency measurement received from the receiver, the control station also has an error signal encoder to provide an error feedback signal containing the polarity and magnitude of the frequency difference for transmission by the transmitter. At least one remote station (20) has a receiver (25), a transmitter (26), a frequency controller (46), an encoder for encoding the request for frequency measurement and for actuating the transmitter (26) to transmit the request, and a decoder (34), responsive to the received error feedback signal for adjusting the frequency control.

20 Claims, 9 Drawing Sheets

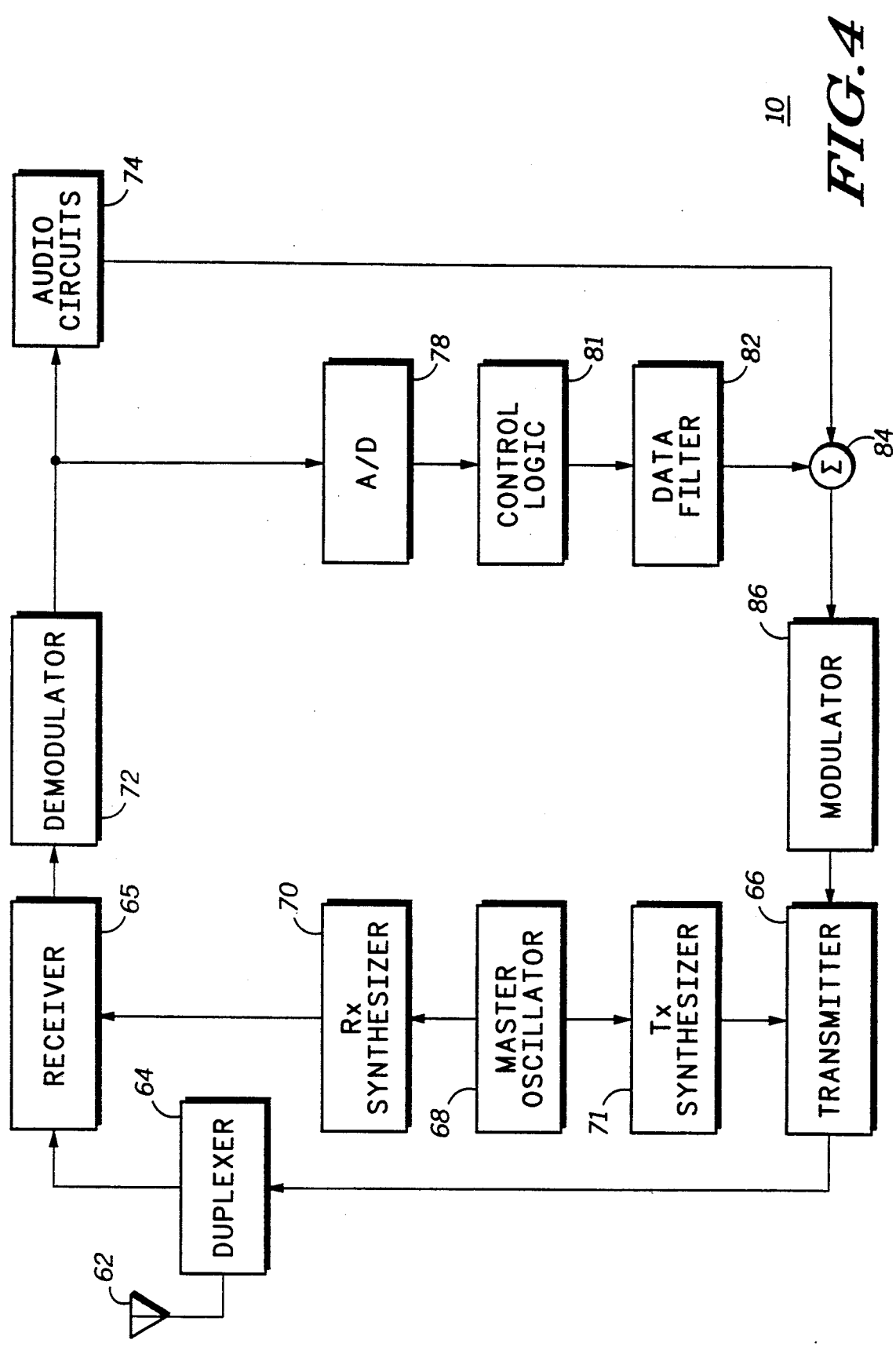

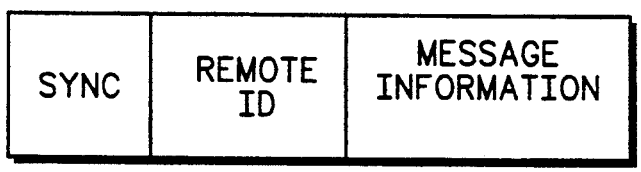
ISW PACKET 710
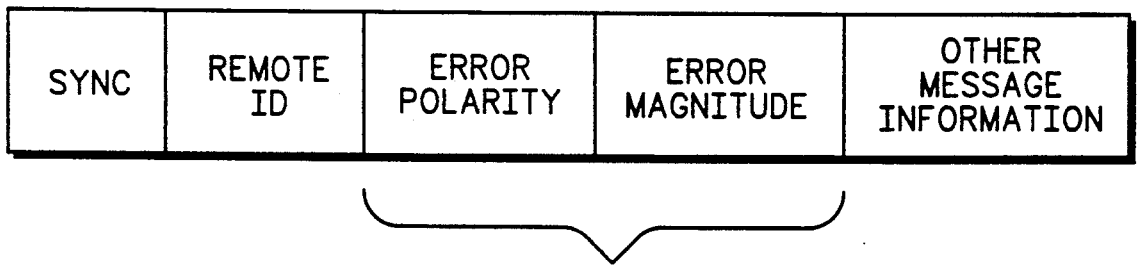
OSW PACKET 750
*FIG. 7*

RADIO FREQUENCY ERROR DETECTION AND CORRECTION SYSTEM

BACKGROUND OF THE INVENTION

This is a continuation-in-part of application Ser. No. 7/413,144, filed Sep. 27, 1989 now abandoned.

This invention relates to a two-way radio communication system, in general, and particularly to a system in which the frequency of radios utilized in the system can be remotely adjusted.

In radio communication systems, the operating frequency of the radios must be maintained within specified limits according to federal regulations (FCC rules). Radios are adjusted for correct operating frequencies at the time of manufacture. However, the aging of components can result in changes in the operating frequency of the radio. Additionally, portable radios are likely to be carried between markedly different thermal environments and thus experience a higher rate of frequency change than fixed stations.

While many two-way radios are now utilizing a frequency synthesizer rather than discrete channel elements for each frequency of operation, it is necessary to maintain the proper reference frequency for the frequency synthesizer. It has conventionally been necessary to remove a radio from service in order for the radio to be tested and adjusted as required on a periodic basis. This approach is undesirable for a number of reasons. Not only is a radio unavailable for use when it is in the shop being adjusted, the process is also expensive as it requires a trained technician to make the necessary adjustments. It is therefore desirable that the radio be adjusted without removing it from operation and without the intervention of a trained technician.

BRIEF SUMMARY OF THE INVENTION

The present invention provides a means such that on request from a remote unit, a control station will generate a digital frequency magnitude and polarity error message to correct the frequency of the remote unit.

Another aspect of the invention is to provide a means to avoid adjacent channel interference due to radios transmitting "off frequency". In one embodiment of the invention, an oscillator is provided which includes an electronic frequency adjustment network plus a digital memory element such as an EEPROM which is used to digitally set the oscillator frequency upon receiving a correction command in response to a request to the control station.

BRIEF DESCRIPTION OF THE DRAWINGS

FIG. 4 is a block-diagram of a control station of FIG. 1.

FIG. 7 are illustrations of the signalling formats in accordance with the present invention.

DESCRIPTION OF THE PREFERRED EMBODIMENT

Figure 1:
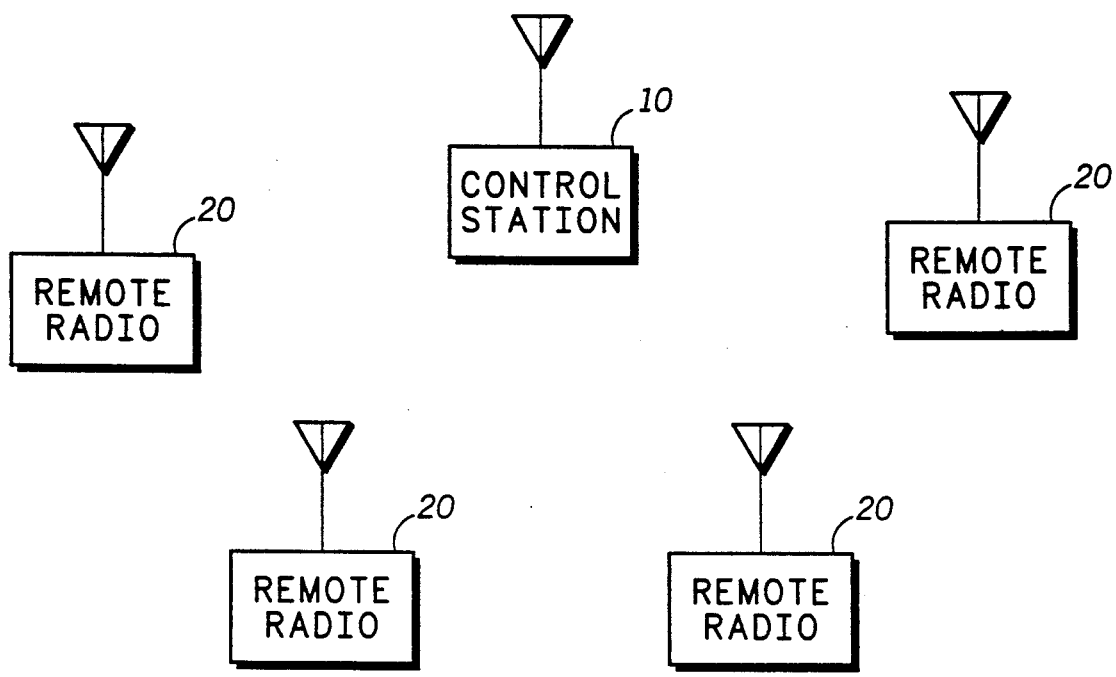
FIG. 1 is a block diagram of a two-way radio system in accordance with the present invention.

Referring to FIG. 1, a two-way radio system in accordance with the present invention is illustrated. A control or central station 10 is utilized in conjunction with a plurality of remote two-way radios 20. The control station 10 can be a base station, a repeater connected to a central controller, or as is discussed below, can be part of a trunked radio communication system. The remote radios 20 can be any combination of portables, mobiles, or base stations capable of communication with the control station 10.

Figure 2:
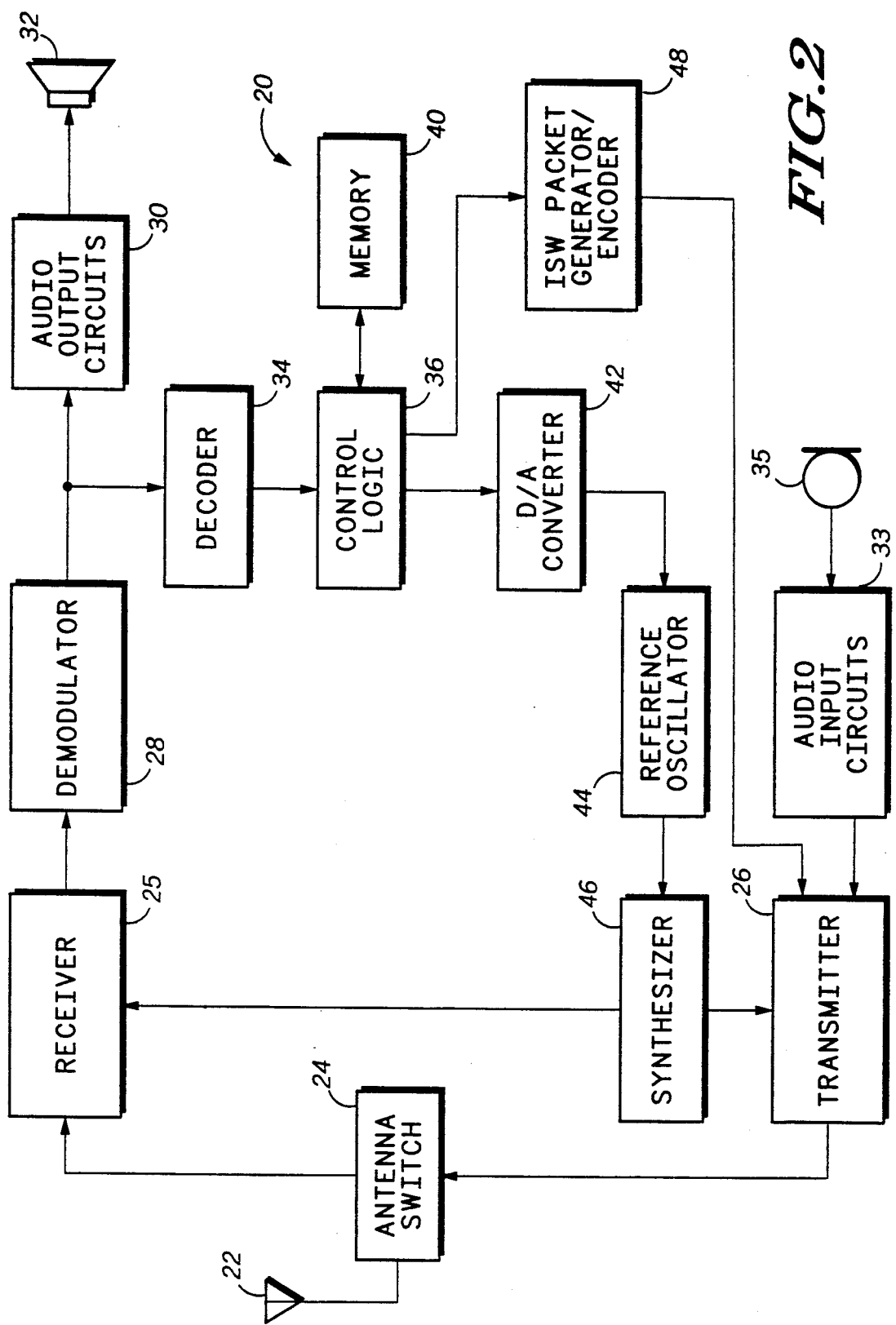
FIG. 2 is a block diagram of a remote two-way radio of FIG. 1.

Referring to FIG. 2, a detailed block diagram of a remote two-way radio 20 in accordance with the present invention is illustrated. Each radio 20 includes an antenna 22 operatively coupled, via an antenna switch 24, to either a receiver section 25 or a transmitter section 26. As is known, the antenna switch 22 may be replaced by a duplexer. A demodulator or discriminator 28, coupled to the output of the receiver section 25, has its output coupled to audio output circuits 30 in a conventional manner for FM frequency to voltage translation or discrimination. The output of audio circuits 30 is applied to a transducer such as a speaker 32.

The output of demodulator 28 is also applied to a decoder 34 which, in turn, is coupled to a control logic 36. In the preferred embodiment, the decoder 34 and control logic 36 are preferably implemented in a microprocessor or microprocessor, but can be discrete circuitry. The control logic 36 communicates with a memory 40, which in a preferred embodiment includes an EEPROM that serves as the radio's code plug (non-volatile memory). As is conventional, the memory 40 would also include a RAM and a ROM. An output of the control logic 36 is connected to a digital to analog (D/A) converter 42 which provides a bias voltage for controlling the frequency of a reference oscillator 44. The oscillator 44 provides the reference frequency signal for a synthesizer 46. The local oscillator signals for both the receiver section 25 and transmitter section 26 are provided by the synthesizer 46 in a conventional manner. A microphone 35 is connected via audio input circuits 33 to the transmitter section 26. As is conventional, the control logic 36 also has control lines, not shown, which connect to the audio circuits 30 and 33, the synthesizer 46, the receiver section 25, the transmitter section 26, the antenna switch 24, and the microphone 35.

Another output of the control logic 36 couples to an ISW packet generator or encoder 48 which in turn is connected to the transmitter 26. The encoder 48 generates a digital signal or data message packet called an inbound signalling word (ISW) 710 which is shown in FIG. 7.

Referring to FIG. 7, to exchange information in a trunked system, a subscriber unit or radio 20 sends a data packet called an "in-bound signalling word" (ISW) 710 to the control station 10. The ISW includes synchronization bits 712, a requesting unit's unique ID code 906 and a data message 716 such as a frequency error measurement request in accordance with the present invention. The ISW 710 is forwarded to the central controller or control station 10 which decodes the request and transmits a data packet called an "out-bound signalling word" (OSW) 750. The OSW is also a data packet having synchronization bits 752, the requesting unit's ID code 906, a digital frequency error message 903 including for example, an error sign bit 756 and error magnitude bits 758, and other message bits 907.

Figure 3:
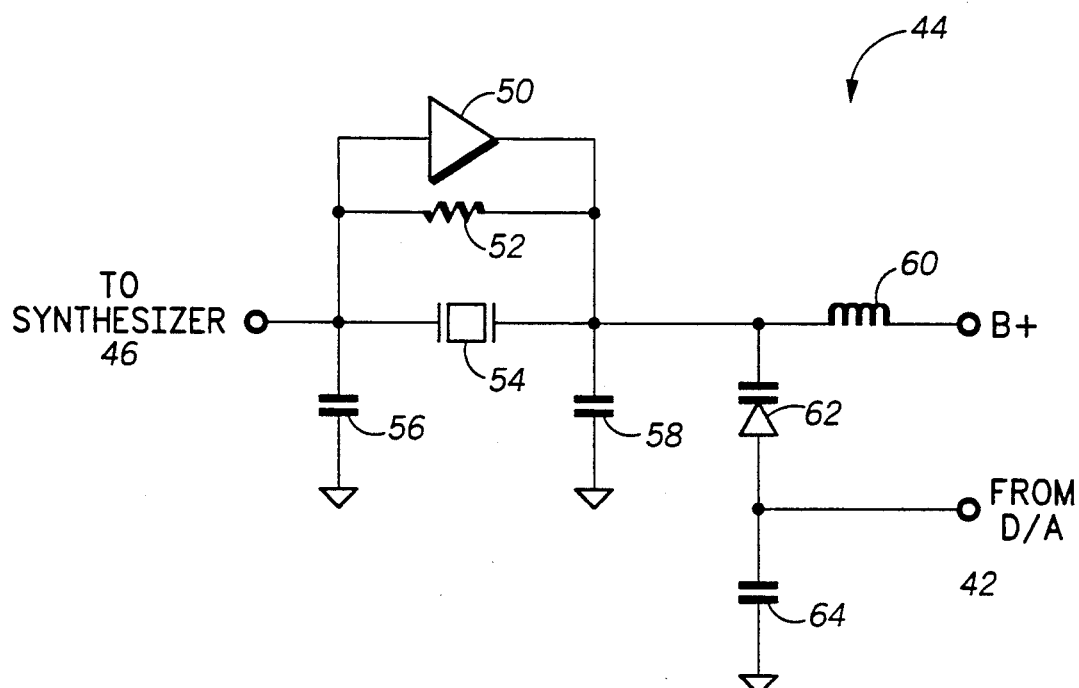
FIG. 3 is a schematic of a reference oscillator of the two-way radio of FIG. 2.

Referring now to FIG. 3, a schematic diagram of the reference oscillator 44 of the two-way radio 20 is illustrated. This reference oscillator 44 may commonly be recognized as a voltage controlled oscillator. An amplifier 50 and a resistor 52 are both connected in parallel across a crystal 54. A capacitor 56 is connected between one side of the crystal 54 and ground while a capacitor 58 is connected between the other side of the crystal 54 to ground. A B+ voltage is supplied via an RF choke 60 to the junction of the crystal 54 and the capacitor 58. An anode of a varactor diode 62 is also connected to this junction of the RF choke 60 and the crystal 54. A capacitor 64 is connected between the cathode of varactor 62 and ground. The cathode of varactor 62 is connected to the output of the D/A converter 42 of FIG. 2.

The amplifier 50 provides the gain for the reference oscillator circuit 44. The feedback portion of the oscillator circuit consists of the resistor 52, the crystal 54, the varactor 62 and the capacitors 56, 58, and 64. The output of the D/A converter 42 along with the B+ bias voltage control the capacitance of varactor 62 in order to warp or change the frequency of the oscillator 44.

Referring to FIG. 4, a block diagram of the control station 10 in accordance with the present invention is illustrated. The control station 10 can be a base station or, as illustrated here, a repeater. An antenna 62 of the repeater 10 is coupled via a duplexer 64 to a receiver section 65 and a transmitter section 66. A master oscillator 68 provides the reference frequency signal for a receiver synthesizer 70 and a transmitter synthesizer 71 which are connected to the receiver section 65 and transmitter section 66, respectively.

A demodulator 72 is coupled to the output of the receiver section 65 and has its output coupled to audio circuits 74. The output of the demodulator 72 is also applied to an analog to digital (A/D) converter 78 which provides a digital signal for the control logic 81 and serves to digitize received signals output from the demodulator 72. Preferably, the control logic is implemented in a microprocessor or microcontroller along with the A/D 78 and together, they comprise an error signal detector and encoder means.

Figure 8:
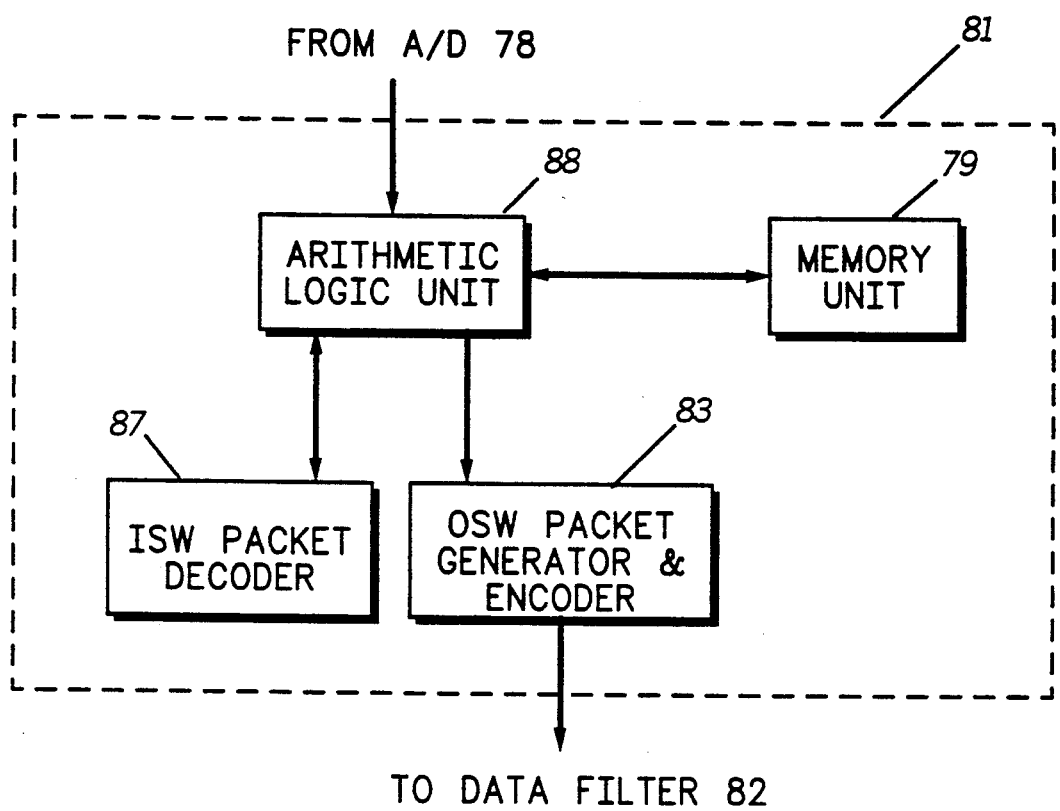
FIG. 8 is a detailed block diagram of the control logic 81 of FIG. 4.
Figure 9:
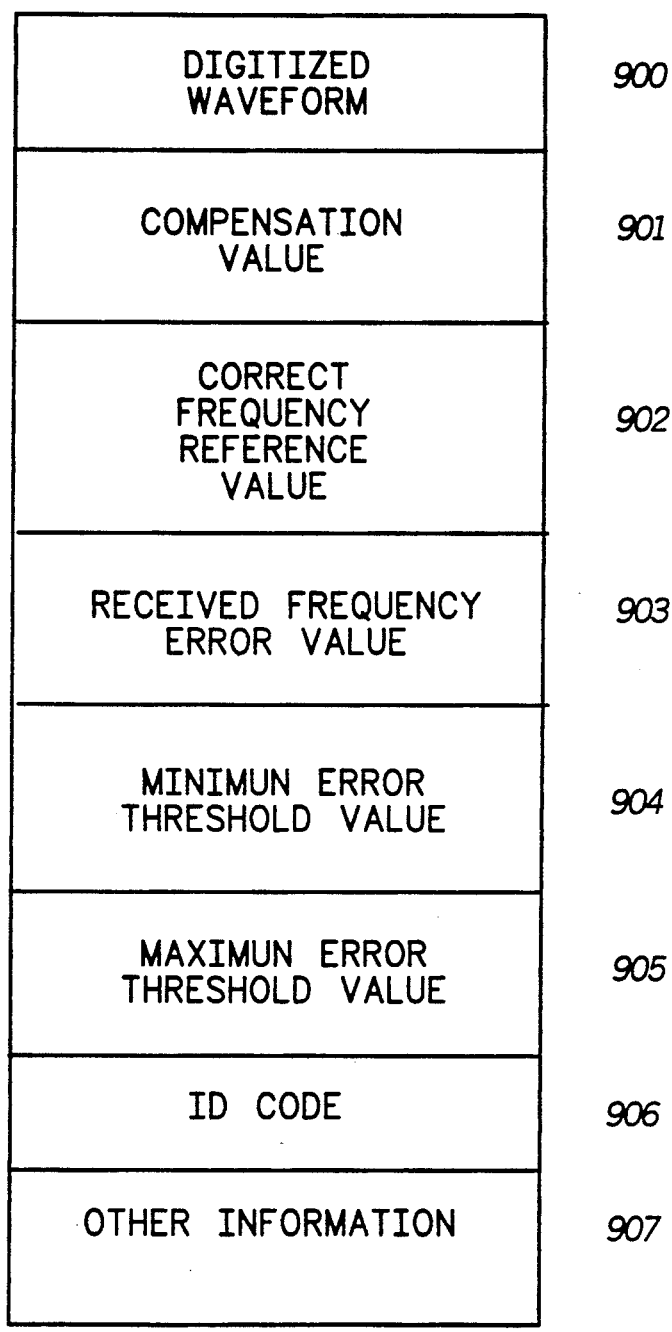
FIG. 9 illustrates the contents of the memory 79 of FIG. 8.

Referring to FIG. 8, a more detailed block diagram of the control logic 81 is shown. An arithmetic logic unit (ALU) 88 receives the digitized signal from the A/D 78 and processes it in the ALU 88. If not used for frequency error measurement, then the processed inbound signalling word ISW packet 710 is sent to an ISW packet decoder 87. An outbound signalling word (OSW 750) packet generator or encoder 83 generates a digital packet from the outputs of the ISW packet decoder 87 and the ALU 88 in conjunction with a memory 79. The contents of the memory 79 are more clearly shown in FIG. 9 and will be described in more detail later.

Referring back to FIG. 4, an output of the control logic 81 (the encoder 83 output of FIG. 8) is connected to a data filter 82 which, in turn, is coupled to the input of a summer 84. Another input of the summer is coupled to the output of the audio circuits 74. The output of the summer 84 is applied to a modulator 86 and then to the transmitter section 66 for transmission in a conventional manner.

In normal operation, the control logic 36 of radio 20 generates a predetermined setting for the reference oscillator 44. This setting is also stored in the memory 40. In order to provide the reference frequency for the synthesizer 46, the D/A converter 42 converts this setting into a bias voltage for controlling the frequency of the reference oscillator 44. According to the invention, the remote radio 20 transmits a data message packet signal requesting frequency measurement of the reference oscillator 44 along with its identification address 906 (in what could be an Inbound Signalling Word (ISW) 710 if the radio is in a trunking environment).

At the control station 10, the demodulator 72 receives the transmitted packet request 710 which is then decoded in the decoder 87. After waiting a short time period before measuring the frequency, the control logic 81 checks the response of a signal strength detector (not shown) in the receiver 65 to determine if the signal is strong and clean enough to measure. Additionally, other checks to ensure a quality correction process can be optionally implemented in the control logic 81.

If the received signal is good, frequency measurement can proceed. By averaging the data stream received, the central station or control station 10 measures the frequency by using the analog to digital converter 78 to convert the transmitted waveform into digitized data usable by the arithmetic logic unit (ALU) 88 and stored in the memory 79. This data may be used for decoding purposes as well as frequency measurement purposes.

In a frequency shift keying (FSK) system, the average value of the waveform corresponds to the average frequency of the transmitted data packet. This is calculated in the ALU 88 of FIG. 8 by adding the digitized waveform values 900 and dividing by the number of waveform data values. This waveform averaged value can then be used to compare each particular waveform value to determine the FSK digital signal pattern to be decoded.

In general, the signal pattern may not be symmetrical and result in a non-zero waveform average value even if the transmitted frequency were the correct frequency. This non-symmetry may be eliminated by choosing a symmetrical pattern or adding a compensation digital word 901 to produce a resultant null for the proper transmitted frequency. Either method will result in a waveform averaged value which correctly represents the remote unit's average transmission frequency.

The ALU result which corresponds to the average frequency received, is retained as a first digital word. Another previously stored digital value, labeled as a second digital word 902, representing the value expected or predetermined for the correct frequency (assuming no receiver tuning, calibration, or other errors) is subtracted from the first digital word in the ALU 88 and the difference is stored as a third digital word 903 in the memory 79 representing the sign and magnitude of the error. This digital error word 903 may be formatted as an actual magnitude representation, a closest stepsize or combination of different stepsizes corresponding to the magnitude, or may be, but not limited to, a representation of the number of incremental correction levels needed for correcting substantially the full magnitude of the error in one step.

The control logic 81 also determines whether the error is too small or too large for the remote unit to correct. Under the condition that the frequency error can and should be corrected, this digital error word 903 is then sent by the ALU 88 for assembly into a packet with other information and encoded by the encoder 83 with other information into a digital data feedback error signal 750 which is transmitted back to the remote radio for corrective action via the modulator 86 and the transmitter 26.

Also stored in the memory 79 are two additional digital words: a fourth digital word 904 representing the magnitude of the minimum correctable error, and a fifth digital word 905 representing the magnitude of the maximum correctable error. If the magnitude of the error word 903 lies within the minimum/maximum range, than the data signal packet 750 containing the sign and magnitude of the error is transmitted to the remote radio as stated above. If the magnitude of the error word 903 is less than the magnitude of the minimum correctable error (904), no correction is necessary and optionally this error signal may be transmitted to the remote radio but no corrective action taken. On the other hand, when the magnitude of the error word 903 exceeds the magnitude of the maximum correctable error (905), the remote radio may be commanded to shut down and transmission inhibited. As a further option, the control logic 81 can generate a command for transmission to the remote unit to re-try frequency correction. If the verification is unsuccessful once too often, the control logic 81 may provide a disable remote radio command instead of generating the data signal for frequency correction. In addition, an alert signal either audible or visual may be generated along with the disabling command. These command signals along with the identification (ID) of the remote radio to be corrected may be incorporated in a digital data message packet (Outbound Signalling Word (OSW) 750 for a trunking application). The identifier was assembled by the packet generator 83 receiving the ID code 906 which was stored there by the ALU 88 when the ISW 710 was decoded by the packet decoder 87.

In response, the remote radio 10, after matching the encoded transmitted word ID with its own identification or address, adjusts its reference oscillator 44. The demodulator 28 recovers the encoded error signal from the receiver output and feeds the information into the decoder 34. Based on the decoded data and control information, the control logic 36, if necessary, changes the value in the memory 40 and outputs a corresponding digital word for the D/A converter 42 to change the reference oscillator 44 in the proper polarity and amount in order to arrive at the proper frequency in one step. As previously described, the voltage thus generated by the digital to analog converter 42 is placed across the varactor 62 to maintain within specified limits the frequency of the synthesizer 46 by overcoming the frequency error.

Figure 5:
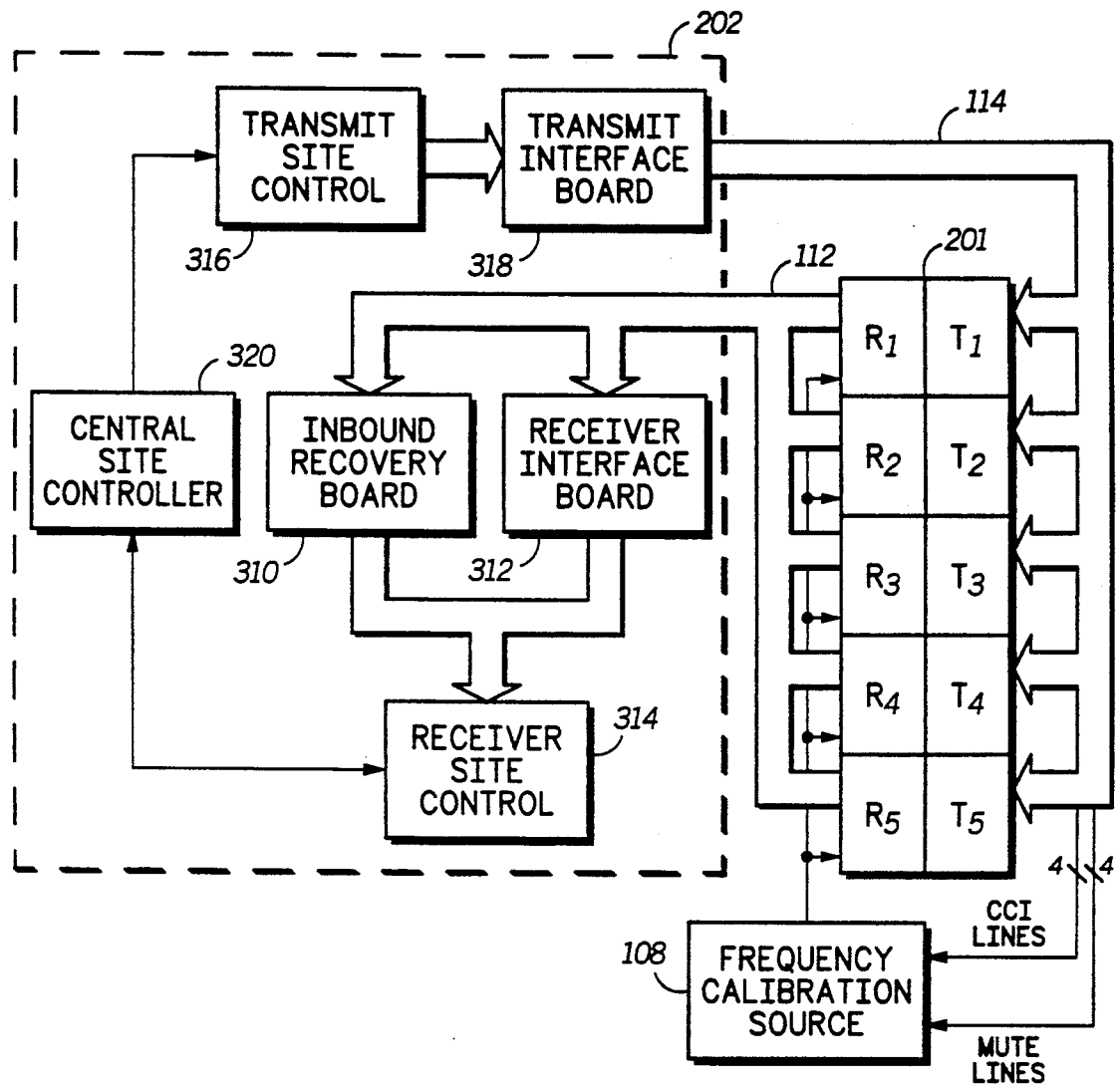
FIG. 5 is a block diagram of a frequency calibration source for use by the central controller in a trunking system.

Referring to FIG. 5, one embodiment of the radio communications system of the present invention is illustrated. The control station 10 of FIG. 4 comprises a central controller 202 coupled to one of a plurality of repeaters 201. In this trunked communication system, the plurality of repeaters 201 each includes a receiver R1-R5 and a transmitter T1-T5. In normal operation, one repeater operates as one control channel to receive inbound and transmit outbound signalling words, and the other repeaters are used for trunked voice and data communications relay, all under the supervision of a central site controller 320.

For frequency calibration operations, each repeater has added circuitry to defeat normal repeater operation and is connected to the external frequency calibration source 108 under the supervision of the central site controller 320. The purpose of the frequency calibration is to assure the accuracy of the second digital word 902 which is used as the reference for remote frequency measurement by the receiver site controller 314 used in the control station 10. If multiple control channels were utilized, calibration would be performed on each control channel repeater and a separate calibration word would be stored for each channel.

The central controller 202 is coupled to the plurality of trunked repeaters 201 via a receive data bus 112 and a transmit data bus 114. The frequency calibration source is coupled to each of the trunked repeaters 201 upon inputs from the control lines (CCI) and the mute lines. The central controller 202 is further comprised of an inbound recovery board (IRB) 310, one or more receiver interface boards (RIB) 312, a receiver site controller (RSC) 314, a transmit site controller (TSC) 316, a transmit interface board (TIB) 318, and a central site controller (CSC) 320. To process the received Inbound Signalling Words (ISW)s and channel information from the frequency calibration source, the RSC 314 containing at least the control logic 81 and the A/D 78 is coupled to the CSC 320.

The above mentioned modules are shown in U.S. Pat. No. 4,698,805 and more fully described in Motorola Instruction Manual 68P81066E60-alphaO, entitled "Trunked Radio System Central Controller", which are hereby incorporated by reference. The Motorola manual is available from the Service Publications Department of Motorola, Inc., 1301 East Algonquin Road, Schaumburg, Ill., 60196.

In operation, a repeater calibration procedure is initiated when the central system controller 320 generates a "Frequency Calibration" command to the receiver site controller 314 to suspend normal ISW decoding of peripheral information such as identification of the remote unit 20. With this command, the control (CCI) and mute lines connect the calibration source 108 to the repeater (R1-R5) currently designated as the control channel for the control station to be calibrated. The external calibration source 108 generates a calibration signal by operating on the remote unit' transmission frequency (currently the trunking control channel).

The calibration procedure is similar to the functions described for frequency measurement of a remote station 20 at the control station 10 in FIG. 4. However, here, the receiver site controller 314 including the control logic 81 performs the steps of frequency calibration where the repeater 210 couples the calibration frequency 108 to simulate the proper or expected frequency transmitted by a remote radio. As before, within the RSC controller 314, the analog-to-digital converter 78 and the control logic 81 with associated memory 79 are used to measure the frequency error between the average frequency received (which should be the calibration frequency) represented by the first digital word, and the proper frequency represented by the second digital word 902 containing the value expected for the proper frequency associated with the frequency calibration source and is already stored in memory in the receiver site controller 314. The main variation is that now the control station itself is being measured, as referenced by the calibration source frequency, instead of the remote unit 20 and the second digital word 902 stored in the memory 79 of the control station 10 will be corrected rather than the frequency error of a remote unit. Preferably there is no correction of the given control channel of a control station; if the frequency of the given control channel of the control station exceeds the correctable limits, a different control channel or control station would then be selected.

Figure 6A:
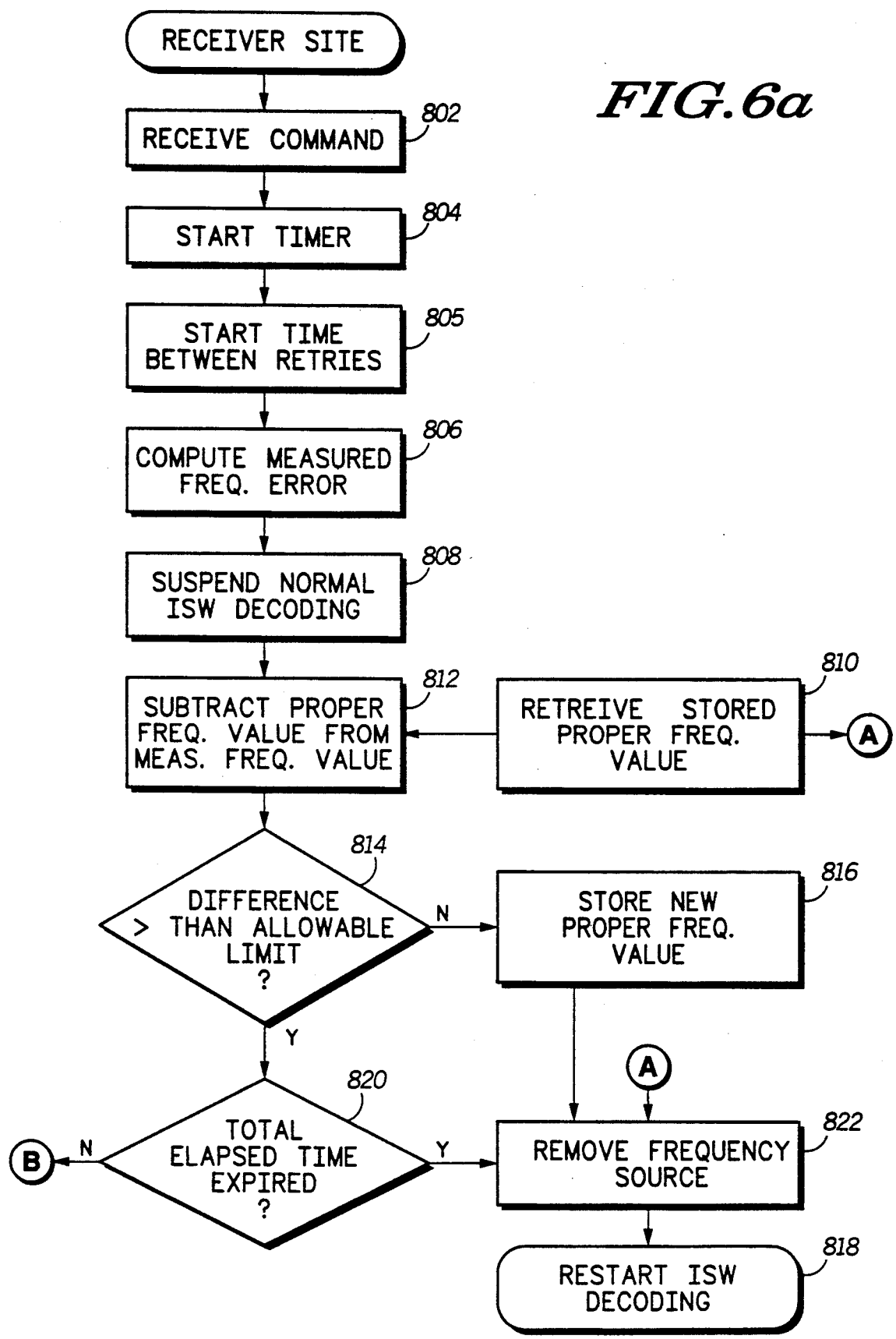
FIGS. 6a–b are simplified flow diagrams of the signal processing in the receiver site controller to calibrate a repeater.
Figure 6B:
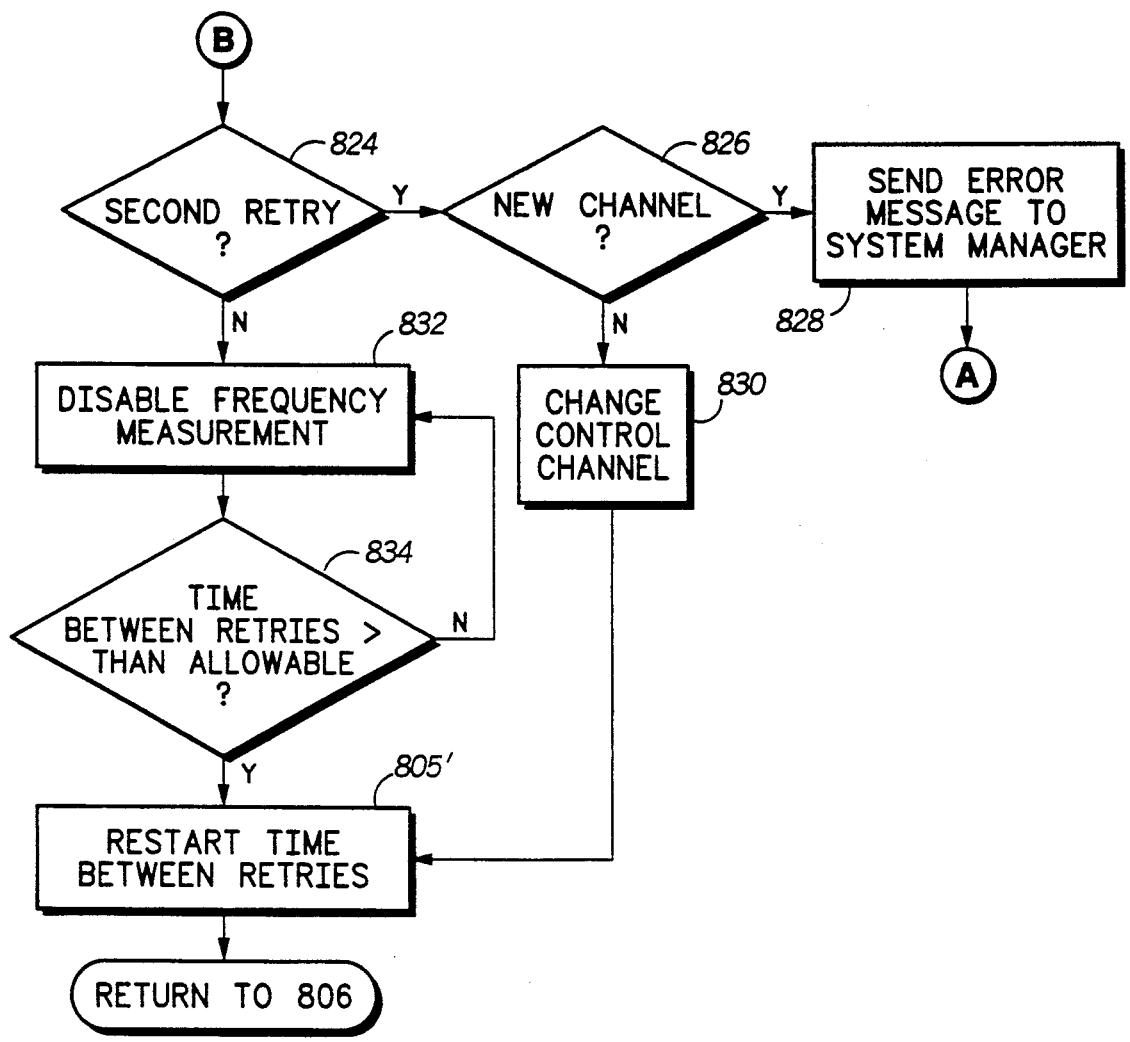

Referring to FIGS. 6a-b, a simplified flow diagram of the signal processing in the receiver site controller 314 is illustrated to calibrate the control station. A "frequency calibration" command generated by the central site controller 320 is received at a block 802 and passed to a timer block 804 to keep track of the total elapsed time available for calibration. To keep track of the time between retries, the routine proceeds to another counter in a block 805. Upon entry, this retry counter 805 is always initialized to zero. As part of the normal ISW decoding procedure, the average A/D value (which is the average frequency received after being converted into the first digital word by the A/D converter) is computed in a block 806, after which, a block 808 suspends the rest of the normal ISW decoding procedure. The second digital word 902 representing the proper frequency already stored in the memory 79 and retrieved in step 810 is subtracted in a block 812 from the value computed in the block 806. A decision 814 determines whether the difference from the block 812 is greater than a predetermined allowable limit. If the difference is within the allowable limit, the routine proceeds to block 816 to store the measured average of block 806 as the new proper frequency value which is now the value representing the proper frequency after calibrating out or compensating for receiver tuning or other incongruities such as A/D sensitivities in block 810 at both the repeater and the receiver site controller. After storage, the routine proceeds to a block 822 to remove the frequency source and resume normal ISW decoding in a block 818.

On the other hand, if the error difference in the block 814 is greater than the allowable limit, the routine proceeds to a decision 820 which determines whether the total allowable time for calibration has expired. If time has expired, the routine exits to the block 822 where the frequency source will be removed and normal decoding resumed (818). The routine exits at this point to continue normal communication processing.

Otherwise referring to FIG. 6b, the routine proceeds to a decision 824 which determines whether this is a second attempt at calibration. An affirmative decision from the decision block 824 transfers program control to a decision 826 to determine whether the current control channel has just been changed. If the channel is new, the routine proceeds to a block 828 to send an error message to a system manager before removing the external source (822) and resuming normal decoding (818). Otherwise, if the channel is not new, the routine proceeds to a block 830 to change the control channel to another repeater. To re-try at calibration, the routine returns to the beginning of the routine via a block 805'. On the other hand, a negative decision from the decision block 824 will enable the routine to proceed to a block 832 where the frequency measurement will be disabled. To determine whether the minimum time between retries has been reached, the routine proceeds to a decision 834. If not enough time has elapsed yet, the routine returns to block 832. Otherwise, the routine returns to the block 805' to retry calibration.

From the above description, it is clear that the invention involves a method of requesting frequency correction including the steps of receiving the request, generating the correction commands and decoding the commands to correct the frequency of the remote unit (or the stored reference value of the repeater). Furthermore, this method provides safeguards to guarantee a certain confidence level that the corrected frequency is indeed correct. The foregoing thus describes a system and method for measuring and keeping routine ISW's to an accuracy sufficient to avoid adjacent channel interference.

In summary, a remote radio (or the control system controller) requests a frequency correction. The control station measures the frequency by averaging the data stream received. If necessary, a signal is transmitted containing the measurement resultant. In response, the remote radio (or the repeater stores a new reference value) adjusts its reference oscillator. However, if the frequency error cannot be corrected, the remote radio (or the repeater) may be commanded to shut down and transmission therefrom is inhibited.

We claim:

1. A radio communication system comprising:
   a control station comprising:
   receiver means for receiving radio signals having a frequency error;
   transmitter means for transmitting radio signals;
   internal frequency reference means to provide a known proper frequency reference;
   frequency measuring means for measuring said received signals to produce a signal indicative of the average frequency received;
   an analog to digital converter and an arithmetic logic unit for converting said signal indicative of the average frequency received into a first digital word;
   memory means for storing a second digital word representing said known proper frequency reference;
   logic means for comparing said first and second digital words to result in a third digital word having a sign and magnitude representing a frequency difference between said average frequency received and said known frequency reference; and
   error signal encoder means to provide a feedback error signal including said third digital word representing the polarity and magnitude of the frequency error for transmission by said transmitter means, responsive to said frequency measuring means; and
   at least one of a plurality of remote stations comprising:
   transmitter means for transmitting radio signals having said frequency error;
   a frequency synthesizer for providing a local oscillator output to said receiver and transmitter means;
   a reference oscillator having a reference frequency for driving said frequency synthesizer;
   receiver means for receiving said feedback error signal; and
   a digital to analog (D/A) converter, responsive to said feedback error signal, for adjusting said reference oscillator to correct for said polarity and magnitude of the frequency error.

2. The radio communication system of claim 1 wherein said least one of said plurality of remote stations further comprises means for encoding and actuating said transmitter means to transmit a request for frequency measurement.

3. The radio communication system of claim 1 wherein said error signal encoder means detects a predetermined limit of correction being reached when a correction needed is too large to be corrected and provides a disable signal for transmission by said transmitter means to disable transmission by said remote station in response thereto.

4. The communication system of claim 3, wherein at least one of said plurality of remote stations further comprises an alert means for generating a distinct signal in response to receiving said disabling signal.

5. The communication system of claim 1, wherein said control station further comprises a signal strength detector means for determining a transmission quality of said received signals.

6. The communication system of claim 1, wherein said at least one of said plurality of remote stations further comprises:
a reference memory for storing a fourth digital word representing a frequency reference, said frequency reference containing said frequency error, said fourth digital word for controlling said reference frequency of said reference oscillator.

7. The radio communication system of claim 1, wherein said control station comprises:
said logic means measuring said frequency difference between said known frequency reference and said average frequency received, said average frequency received related to said local oscillator output of at least one of said remote stations; and
wherein said at least one of said plurality of remote stations comprises:
said digital to analog (D/A) converter, responsive to said third digital word for generating an output voltage having a polarity and magnitude indicative of said difference, and means for applying a control output voltage to control said reference frequency of said reference oscillator.

8. The communication system of claim 7, wherein said at least one of said plurality of remote stations further comprises:
control logic means for programming said fourth digital word and storing said fourth digital word in said reference memory which is used for controlling said reference frequency; and
said reference oscillator comprising a voltage controlled oscillator (VCO) for receiving said control output voltage to control said reference frequency.

9. The communication system of claim 1, wherein said logic means measuring said difference between said known frequency reference and said average frequency received, said average frequency received is related to said local oscillator output of said frequency synthesizer for at least one of said remote stations to transmit said radio signals.

10. The communication system of claim 1, wherein said frequency measuring means comprises:
a master oscillator coupled to said receiver means; and
frequency shift keying (FSK) averaging means, responsive to an output of said master oscillator of said control station, for producing said signal indicative of the average frequency received.

11. An addressable remote station for use in a communication system having a control station, said remote station comprising:
controllably tuned transmitter means, having a transmit frequency, for transmitting an radio frequency signal at said transmit frequency;
controllably tuned receiver means, having a receive frequency, for receiving radio frequency signal transmissions at said receive frequency;
a frequency synthesizer for providing said transmit frequency to said transmitter means and said receive frequency to said receiver means;
a reference oscillator having a reference frequency for driving said frequency synthesizer;
a reference memory for storing a first digital word representing a frequency reference for setting said reference frequency, said frequency reference containing a frequency error;
means for encoding a request for frequency measurement, coupled to said transmitter means, for generating and sending a frequency measurement request, including said frequency error, to said control station;
identification means, coupled to said transmitter means for generating and sending a predetermined identification signal in conjunction with said request signal; and
a digital to analog converter, coupled to said receiver means for receiving a transmitted error signal including a second digital word, representing the polarity and magnitude of the frequency error, from said control station and, in response thereto, controllably tuning said reference oscillator to correct for said polarity and magnitude of the frequency error.

12. A method of correcting a frequency of a remote station by a control station having receiving and transmitting means, the method comprising the steps of:
in said control station:
receiving radio signals having a frequency error and a request for frequency measurement;
providing a known proper frequency reference;
measuring said received signals to produce a signal indicative of the average frequency received;
converting said signal indicative of the average frequency received into a first digital word;
storing a second digital word representing said known proper frequency reference;
comparing said first and second digital words to result in a third digital word having a sign and magnitude representing a frequency difference between said average frequency received and said known frequency reference; and
transmitting a feedback error signal including said third digital word representating the polarity and magnitude of the frequency error of said error signal, responsive to the request for frequency measurement; and
in said remote station:
storing a fourth digital word representing a frequency reference, said frequency reference containing said frequency error;
converting, in a digital to analog converter, said fourth digital word into a control output voltage;
applying said control output voltage to a reference oscillator, having a reference frequency, to control said reference frequency of said reference oscillator;

synthesizing a transmit frequency relative to said reference frequency;

encoding said request for frequency measurement;

transmitting said request including said frequency error at said transmit frequency;

correcting said frequency reference, in response to said feedback error signal for adjusting said fourth digital word in relationship to said third digital word to provide a resultant word, and substituting said resultant word as a new fourth digital word representing said frequency reference, to correct for said polarity and magnitude of the frequency error;

converting, in said digital to analog converter, said new fourth digital word into a corrected control output voltage; and applying said corrected control output voltage to said reference oscillator to adjust said reference frequency of said reference oscillator.

13. The method of claim 12 further comprising the steps of:

in said control station:

receiving identifying information in said radio signals;

determining a quality indication of said radio signals;

measuring said received signals if said quality indication is acceptable;

generating said third digital word, said feedback error signal including a correction command to said remote station to change said frequency reference of said remote station if said error does not exceed a limit of correction; and transmitting identifying information of said remote station and said third digital word to said remote station.

14. The method of claim 13 wherein said generating step comprises the steps of:

comparing said frequency error in an error limit range; and generating a disable code if said frequency error is greater than the maximum correctable frequency error in said error limit range.

15. The method of claim 13, comprising the steps of:

in said remote unit;

transmitting said request comprising an inbound signalling word (ISW), said ISW requesting frequency correction and providing its identification;

in said control station;

receiving said ISW to determine which remote station is requesting correction; and transmitting said feedback error signal comprising an outbound signalling word (OSW) to said remote unit, said OSW constituting frequency correction information including said third digital word.

16. The method of of claim 12 further comprising the steps of:

matching a received address from said control station with the address of the remote station;

decoding said feedback error signal to provide a decoded feedback error signal; and adjusting said fourth digital word in response to said decoded feedback error signal.

17. A radio communication calibration system for a control station comprising:

receiver means for receiving radio signals;

a known external calibration sourcing means for connecting to said receiver means to provide a known frequency reference to said control station;

frequency measuring means for measuring said known frequency reference to produce a signal indicative of the average frequency received;

an analog to digital converter and an arithmetic logic unit for converting said signal indicative of the average frequency received into a first digital word;

memory means for storing a second digital word representing a known proper frequency reference;

logic means for comparing said first and second digital words to result in a third digital word having a sign and magnitude representing a frequency difference between said average frequency received and said known frequency reference for providing an error signal;

logic means for detecting whether said third digital word is within an allowable limit;

encoder means to provide said first digital word, if said third digital word is within said allowable limit, for substituting said first digital word in said memory means as said second digital word representing said known proper frequency reference; and transmitter means, connected to said logic means, for transmitting radio signals, if said third digital word is within said allowable limit.

18. A radio communication and calibration system comprising:

a control station comprising:

receiver means for receiving radio signals having a frequency error and for receiving a request for frequency measurement;

a known external calibration sourcing means, for connecting to said receiver means to provide a known frequency reference to said control station;

frequency measuring means for measuring one of a group, comprising said known frequency reference and said received signals, in response to said request, to produce a signal indicative of the average frequency received;

an analog to digital converter and an arithmetic logic unit for converting said signal indicative of the average frequency received into a first digital word;

memory means for storing a second digital word representing a known proper frequency reference;

first logic means for comparing said first and second digital words to result in a third digital word having a sign and magnitude representing a frequency difference between said average frequency received and said known frequency reference for providing an error signal;

second logic means for detecting whether said third digital word is within an allowable limit;

reference encoder means to provide said first digital word, if said third digital word is within said allowable limit, for substituting said first digital word in said memory means as said second digital word representing said known proper frequency reference; and transmitter means, connected to said logic means, for transmitting radio signals, if said third digital word is within said allowable limit; and error signal encoder means to provide a feedback error signal including a representation of the polarity and magnitude of the frequency error of said error signal for transmission by said transmitter means, responsive to said request for frequency measurement received from said receiver means and said frequency measuring means; and at least one of a plurality of remote stations comprising:

transmitter means for transmitting said request;

frequency control means having a reference memory for storing a fourth digital word representing a frequency reference, said frequency reference containing said frequency error;

means for encoding said request for frequency measurement and for actuating said transmitter means to transmit said request including said frequency error;

receiver means for receiving said feedback error signal; and frequency error correction means, responsive to said feedback error signal for adjusting said fourth digital word in said reference memory, in relationship to said third digital word, to provide a resultant word, and for substituting said resultant word in said reference memory as a new fourth digital word representing said frequency reference, to correct for said polarity and magnitude of the frequency error.

19. A control station comprising:

receiver means for receiving radio signals having a frequency error and for receiving a request for frequency measurement;

internal frequency reference means to provide a known proper frequency reference;

frequency measuring means for measuring said received signals to produce a signal indicative of the average frequency received;

an analog to digital converter and an arithmetic logic unit for converting said signal indicative of the average frequency received into a first digital word;

memory means for storing a second digital word representing said known proper frequency reference;

logic means for comparing said first and second digital words to result in a third digital word having a sign and magnitude representing a frequency difference between said average frequency received and said known frequency reference;

transmitter means for transmitting radio signals; and error signal encoder means for providing a reference oscillator correction signal, said correction signal, including said third digital word representing the polarity and magnitude of the frequency error, for transmission by said transmitter means to a remote station, responsive to said request for frequency measurement received and responsive to said frequency measuring means.

20. A trunked radio communication system comprising:

a control station comprising:

receiver means for receiving radio signals having a frequency error and for receiving an inbound signalling word containing a request for frequency measurement;

an internal frequency reference means to provide a known proper frequency reference;

frequency measuring means for measuring said received signals to produce a signal indicative of the average frequency received;

an analog to digital converter and an arithmetic logic unit for converting said signal indicative of the average frequency received into a first digital word;

memory means for storing a second digital word representing said known proper frequency reference;

logic means for comparing said first and second digital words to result in a third digital word having a sign and magnitude representing a frequency difference between said average frequency received and said known frequency reference;

transmitter means for transmitting radio signals; and error signal encoder means for encoding a responsive outbound signal word containing an error word having polarity and magnitude of frequency error information, for transmission by said transmitter means, in response to said inbound signalling word containing said request; and at least one of a plurality of remote stations comprising:

transmitter means, having a transmit frequency, for transmitting said inbound signalling word at said transmit frequency;

a frequency synthesizer for providing said transmit frequency to said transmitter means;

a reference oscillator having a reference frequency for driving said frequency synthesizer;

a reference memory for storing a fourth digital word representing a frequency reference, said frequency reference containing said frequency error, said fourth digital word for controlling said reference frequency of said reference oscillator;

means for encoding said request for frequency measurement and for actuating said transmitter means to transmit said request in said inbound signalling word, said request including said frequency error;

receiver means for receiving said outbound signalling word;

control logic means, responsive to said outbound signal word for adjusting said fourth digital word, in said reference memory, in relationship to said error word, received from said control station, to provide a resultant word, and for substituting said resultant word in said reference memory as a new fourth digital word representing said frequency reference, to correct for said polarity and magnitude of the frequency error; and a digital to analog (D/A) converter, responsive to said new fourth digital word, for adjusting said reference oscillator to correct for said polarity and magnitude of the frequency error.

* * * * *